(12) United States Patent
Ichinose (10) Patent No.: US 10,318,422 B2
(45) Date of Patent: Jun. 11, 2019

(54) COMPUTER-READABLE RECORDING MEDIUM STORING INFORMATION PROCESSING PROGRAM, INFORMATION PROCESSING APPARATUS, AND INFORMATION PROCESSING METHOD

(71) Applicant: FUJITSU LIMITED, Kawasaki-shi, Kanagawa (JP)

(72) Inventor: Katsumi Ichinose, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 15/268,868

(22) Filed: Sep. 19, 2016

(65) Prior Publication Data

US 2017/0097890 A1 Apr. 6, 2017

(30) Foreign Application Priority Data

Oct. 5, 2015 (JP) .................................. 2015-197905

(51) Int. Cl.
| | |
|---|---|
| *G06F 12/00* | (2006.01) |
| *G06F 13/00* | (2006.01) |
| *G06F 13/28* | (2006.01) |
| *G06F 12/0815* | (2016.01) |
| *G06F 12/0893* | (2016.01) |

(52) U.S. Cl.
CPC ...... *G06F 12/0815* (2013.01); *G06F 12/0893* (2013.01); *G06F 2212/604* (2013.01)

(58) Field of Classification Search
CPC ........................ G06F 12/0815; G06F 2212/604
USPC ........................................................ 711/141
See application file for complete search history.

(56) References Cited

U.S. PATENT DOCUMENTS

| | | | |
|---|---|---|---|
| 5,457,793 A | 10/1995 | Elko et al. | |
| 5,784,697 A | 7/1998 | Funk et al. | |
| 7,895,399 B2 * | 2/2011 | Tomita ................ | G06F 12/0862 711/130 |
| 2002/0198924 A1 | 12/2002 | Akashi et al. | |
| 2012/0042131 A1 * | 2/2012 | Flemming ........... | G06F 12/0284 711/129 |

(Continued)

FOREIGN PATENT DOCUMENTS

| | | |
|---|---|---|
| JP | H06-083782 A | 3/1994 |
| JP | H10-011305 A | 1/1998 |
| JP | 2003-006175 A | 1/2003 |

*Primary Examiner* — Mohammed M Gebril
(74) *Attorney, Agent, or Firm* — Fujitsu Patent Center (57) ABSTRACT

A computer-readable recording medium storing an information processing program for causing a computer to execute a process, the process includes: acquiring a cache memory size allocated to each process within an application program; acquiring a cash miss ratio for a process executed using an allocated cache memory size; correcting a cache memory size to be allocated to the process based on an acquired cache miss ratio; acquiring a first cache memory size allocated to the process after the correcting is performed; acquiring a first performance value when the process is executed using the first cache memory size; acquiring a second cache memory size which is allocated to the process later than the first cache memory size; acquiring a second performance value when the process is executed using the second cache memory size; and correcting the second cache memory size based on the first performance value and the second performance value.

12 Claims, 12 Drawing Sheets

(56) References Cited

U.S. PATENT DOCUMENTS

2013/0318196 A1* 11/2013 Yamamoto .......... G06F 12/0871
 709/215
2014/0040556 A1* 2/2014 Walker .................. G06F 9/5016
 711/130
2014/0344504 A1* 11/2014 Luo ..................... G06F 12/0842
 711/103
2016/0196206 A1* 7/2016 Kang .................. G06F 12/0888
 711/171

* cited by examiner

PA INFORMATION FILE 151

| ALLOCATION CACHE MEMORY SIZE | RATIO LL OF MEMEORY ACCES INSTRUCTIONS | CACHE MISS RATIO CM | RATIO CC OF WAIT TIME FOR ACCESS |
|---|---|---|---|
| CS1 | ... | ... | ... |

FIG. 7

INFORMATION DATA FILE  152

| ALLOCATION CACHE MEMORY SIZE | EXECUTION TIME |
|---|---|
| ⋮ | ⋮ |
| CSn-1 | Tn-1 |
| CSn | Tn |
| CSn+1 | |

COMPUTER-READABLE RECORDING MEDIUM STORING INFORMATION PROCESSING PROGRAM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2015-197905, filed on Oct. 5, 2015, the entire contents of which are incorporated herein by references.

FIELD

The embodiments discussed herein are related to a computer-readable recording medium storing information processing program, an information processing apparatus, and an information processing method.

BACKGROUND

Operating characteristics of a processor when each process is made to operate on each processor are conjectured based on the operation characteristics of the processor and an allocation of each process to the processor is optimized.

Related techniques are disclosed in, for example, Japanese Laid-open Patent Publication No. 06-083782, Japanese Laid-open Patent Publication No. 10-011305, and Japanese Laid-Open Patent Publication No. 2003-006175.

SUMMARY

According to one aspect of the embodiments, a non-transitory computer-readable recording medium storing an information processing program for causing a computer to execute a process, the process includes: acquiring a cache memory size allocated to each process within an application program; acquiring a cash miss ratio for a process executed using an allocated cache memory size; correcting a cache memory size to be allocated to the process based on an acquired cache miss ratio; acquiring a first cache memory size allocated to the process after the correcting is performed; acquiring a first performance value in a case where the process is executed using the first cache memory size; acquiring a second cache memory size which is allocated to the process later than the first cache memory size; acquiring a second performance value in a case where the process is executed using the second cache memory size; and correcting the second cache memory size based on the first performance value and the second performance value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

There may be a problem of insufficient execution speed.

According to one aspect of the present disclosure, there is provided, for example, a program that makes it possible to improve an execution speed.

Embodiment 1

Figure 1:
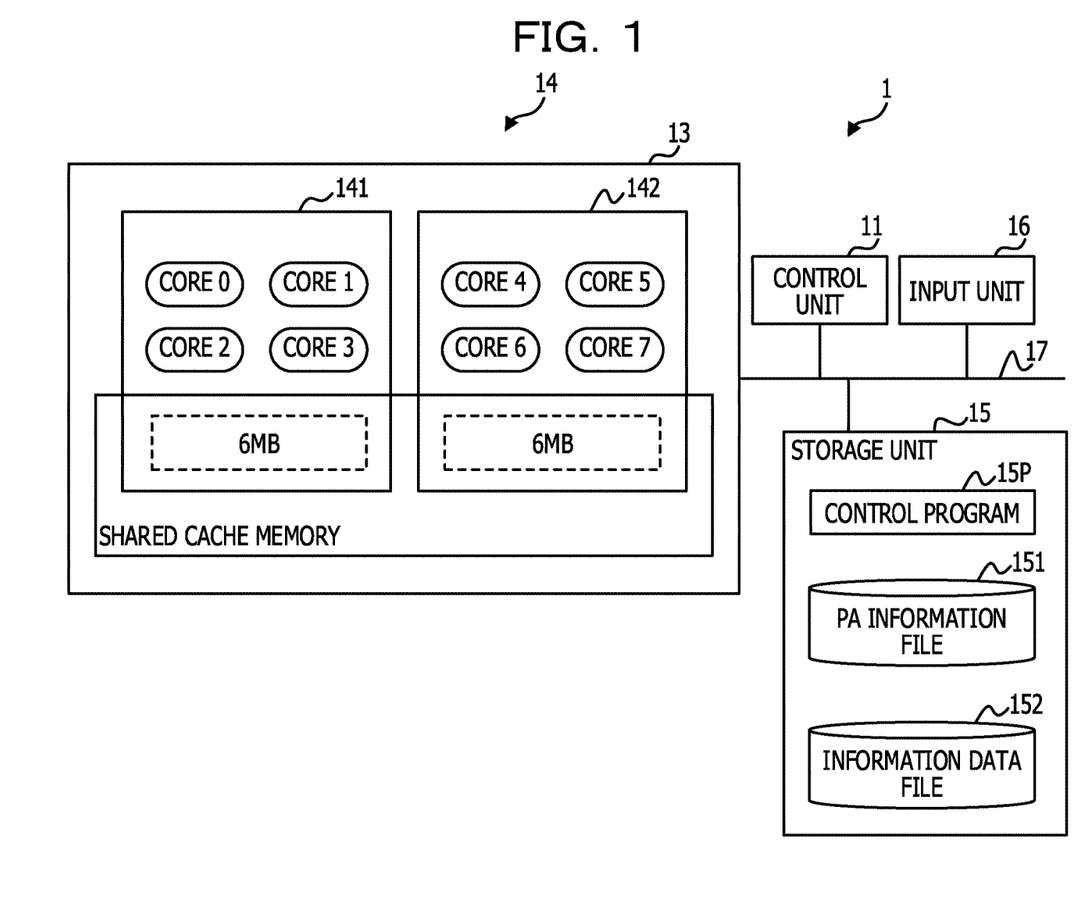
FIG. 1 is a block diagram illustrating a hardware group of an information processing apparatus.

Hereinafter, description will be made on an embodiment with reference to the accompanying drawings. FIG. 1 is a block diagram illustrating a hardware group of an information processing apparatus 1. The information processing apparatus 1 includes, for example, a control unit 11, a multi-core processor 13, an input unit 16, and a storage unit 15. The multi-core processor 13 includes a plurality of CPU cores (hereinafter, referred to as core) and allows a shared cache memory to be shared by the plurality of cores. In an example of FIG. 1, the shared cache memory is allocated in a division size in proportion to the number of cores used for each process based on an equivalent division method. Four cores of core 0 to core 3 are grouped in a non-uniform memory access (NUMA) node 141. In the NUMA node 141, a cache memory of 6 MB, which is a half of a shared cache memory of 12 MB, is allocated.

Similarly, four cores of core 4 to core 7 are grouped also in a NUMA node 142. In the NUMA node 142 (simply referred to as NUMA node 14 in some cases), a cache memory of 6 MB, which is a half of a shared cache memory of 12 MB, is allocated. The control unit 11 is coupled with respective components of hardware through a bus 17. The control unit 11 performs, for example, a process for calculating a cache memory size to be allocated to each process in accordance with a control program 15P stored in the storage unit 15. The control unit 11 may be a processor. Although the control program 15P is described as an application in the present embodiment, the control program 15P may be middleware.

The input unit 16 is an input device such as a mouse, a keyboard, or a touch panel and outputs received operation information to the control unit 11. The storage unit 15 is a hard disk or a large capacity memory and stores, for example, the control program 15P. The storage unit 15 additionally stores, for example, a performance analyzer (PA) information file 151 and an information data file 152. The PA information file 151 and the information data file 152 will be described later.

Figure 2:
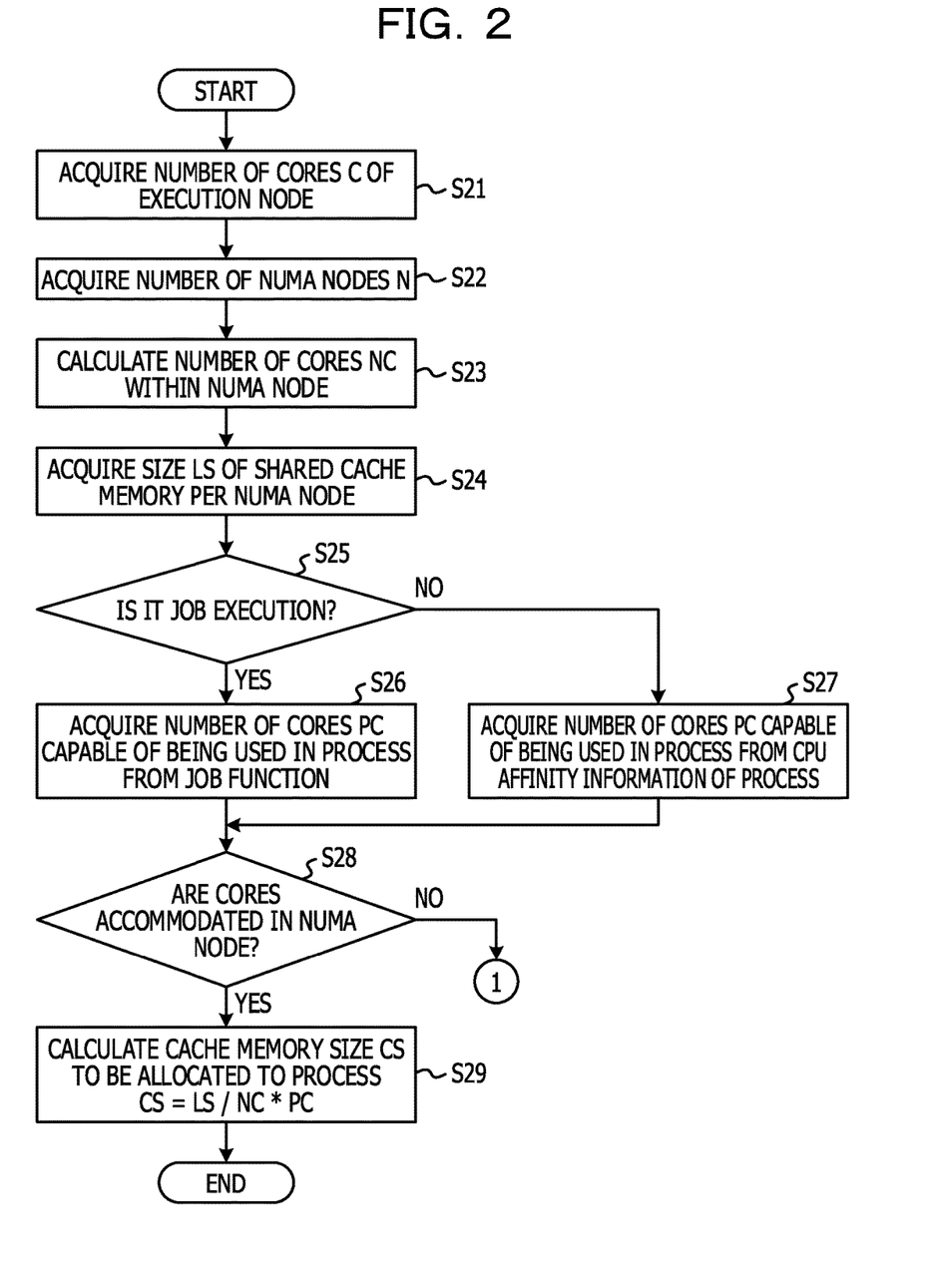
FIG. 2 is a flowchart illustrating a calculation procedure of a cache memory size based on an equivalent division method.
Figure 3:
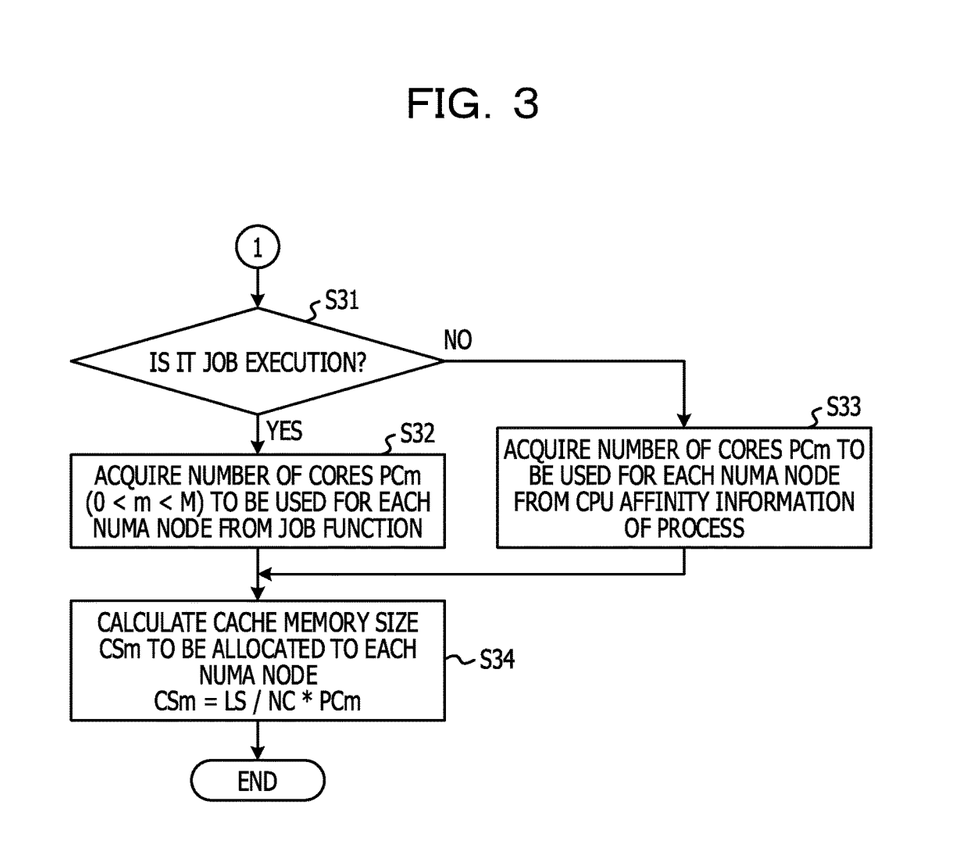
FIG. 3 is another flowchart illustrating the calculation procedure of the cache memory size based on the equivalent division method.

FIG. 2 and FIG. 3 are flowcharts illustrating a calculation procedure of a cache memory size based on an equivalent division method. The control unit 11 refers to the hardware information stored in the storage unit 15 to acquire the number of cores C of an execution node (Operation S21). The control unit 11 refers to the storage unit 15 to acquire the number of NUMA nodes N of the execution node (Operation S22). The control unit 11 calculates the number of cores NC within a single NUMA node 14 of the execution node. For example, the control unit 11 calculates the number of cores NC by dividing the number of cores C by the number of NUMA nodes N (Operation S23).

The control unit 11 refers to the hardware information to acquire a size LS of the shared cache memory per the NUMA node 14 (Operation S24). The control unit 11 refers to the storage unit 15 to determine whether it is a job execution (Operation S25). When it is determined that it is the job execution ("YES" at Operation S25), the control unit 11 causes the process to proceed to Operation S26. The control unit 11 refers to a job function stored in the storage unit 15 to acquire the number of cores PC capable of being used in the process (Operation S26).

When it is determined that it is not the job execution ("NO" at Operation S25), the control unit 11 causes the process to proceed to Operation S27. The control unit 11 acquires the number of cores PC capable of being used in the process from CPU affinity information of the process (Operation S27). After Operation S26 and Operation S27 are performed, the control unit 11 determines whether all the cores used in the process are accommodated in a single NUMA node 14 (Operation S28). When it is determined that all the cores are accommodated ("YES" at Operation S28), the control unit 11 proceeds to Operation S29. The control unit 11 calculates the cache memory size CS to be allocated to the process (Operation S29). For example, the shared cache memory size LS is divided by the number of cores NC within the NUMA node 14. The value obtained by the division is multiplied by the number of cores PC capable of being used in the process.

When it is determined that all the cores are not accommodated in a single NUMA node 14 ("NO" at Operation S28), for example, in a case where the number of cores used for a process extends over a plurality of (M) NUMA nodes 14, the control unit 11 causes the process to proceed to Operation S31. The control unit 11 determines whether it is the job execution (Operation S31). When it is determined that it is the job execution ("YES" at Operation S31), the control unit 11 causes the process to proceed to Step S32. The control unit 11 acquires the number of cores PCm to be used for each NUMA node 14 from the job function (Operation S32). Here, m is 0<m<M.

When it is determined that it is not the job execution ("NO" at Operation S31), the control unit 11 causes the process to proceed to Step S33. The control unit 11 acquires the number of cores PCm to be used for each NUMA node 14 from the CPU affinity information of the process (Operation S33). After Operation S32 or Operation S33 is performed, the control unit 11 calculates the cache memory size CSm to be allocated to each NUMA node 14 (Operation S34). For example, the shared cache memory size LS is divided by the number of cores NC within the NUMA node 14 and the value obtained by the division is multiplied by the number of cores PCm to calculate the cache memory size CSm to be allocated.

Figure 4:
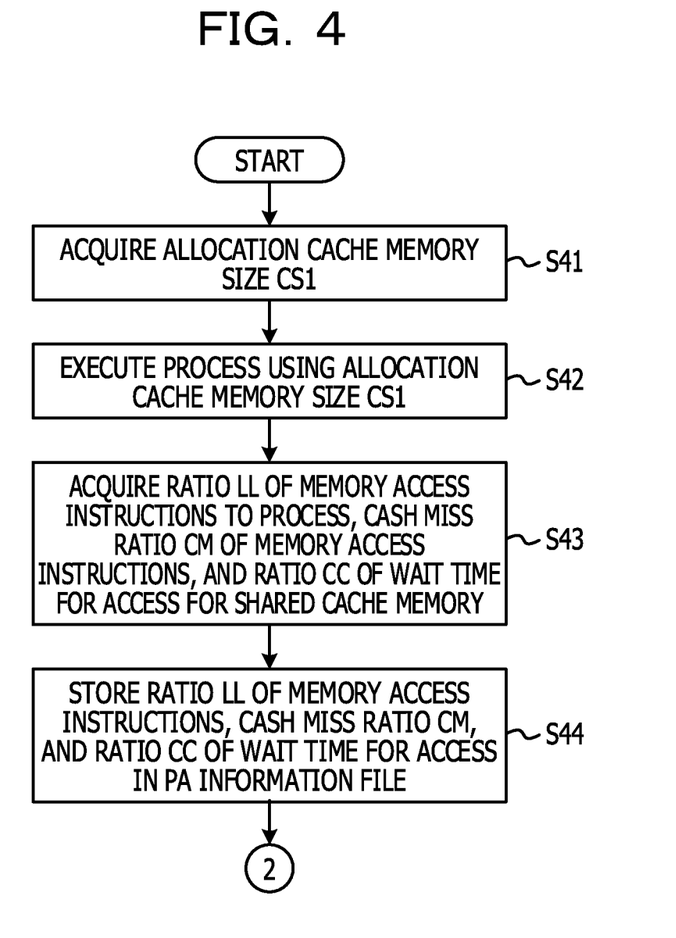
FIG. 4 is a flowchart illustrating a procedure of a correction process for a cache memory size.
Figure 5:
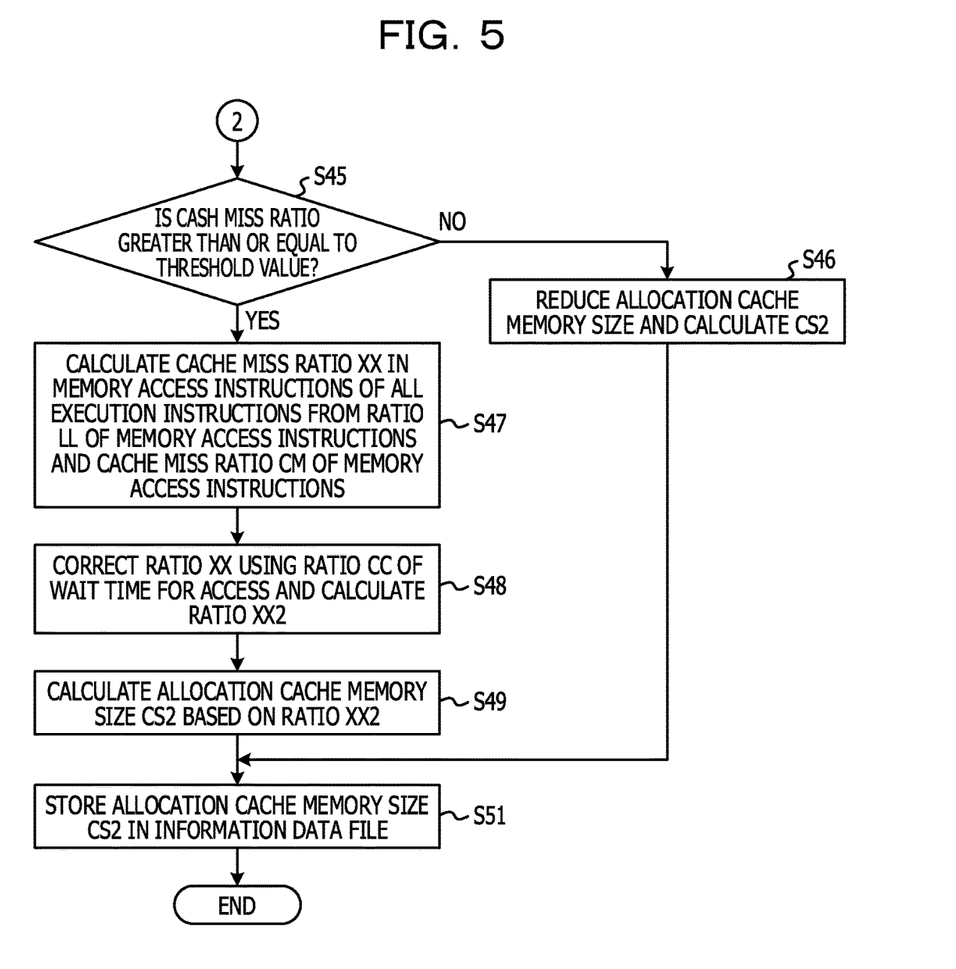
FIG. 5 is another flowchart illustrating the procedure of the correction process for the cache memory size.

FIG. 4 and FIG. 5 are flowcharts illustrating a procedure of a correction process for a cache memory size. In the following, in order to make the explanation easier to understand, descriptions will be made by way of an example in which a cache size CS1 (hereinafter, referred to as an allocation cache memory size CS1) obtained at Operation S29 is used based on the equivalent division method. The control unit 11 acquires the allocation cache memory size CS1 (Operation S41). The control unit 11 executes a process of an application program once using the allocation cache memory size CS1 (Operation S42). The control unit 11 acquires a ratio LL of memory access instructions to the process, a cash miss ratio CM of the memory access instructions, and a ratio CC of a wait time for access to the shared cache memory (Operation S43). For example, the control unit 11 refers to the hardware information of a profiler (information used for performing a performance analysis stored in CPU) to acquire the pieces of the information of the ratios LL, CM, and CC (hereinafter, referred to as PA information as a representative in some cases).

Figure 6:
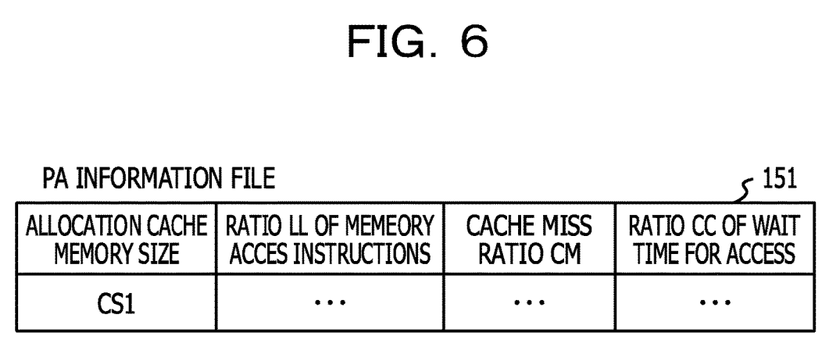
FIG. 6 is a table for explaining stored contents of a PA information file.

The control unit 11 stores the ratio LL of memory access instructions to the process, the cash miss ratio CM of the memory access instructions, and the ratio CC of a wait time for access to the shared cache memory in a PA information file 151 (Operation S44). FIG. 6 is a table for explaining the stored contents of the PA information file 151. In the PA information file 151, the ratio LL of memory access instructions to the process, the cash miss ratio CM of the memory access instructions, and the ratio CC of a wait time for access to the shared cache memory are stored in correlation with the allocation cache memory size for each process. The control unit 11 stores the PA information of the process in the PA information file 151 after executing the process using the allocation cache memory size.

The control unit 11 reads a threshold value from the storage unit 15. The control unit 11 determines whether the acquired cash miss ratio is greater than or equal to the threshold value (Operation S45). The threshold value may be set to, for example, 5%. A numerical value used in the embodiments is just an example and is not limited thereto. The threshold value may be changed into an appropriate value from the input unit 16. When it is determined that the acquired cash miss ratio is not greater than or equal to the threshold value ("NO" at Operation S45), the control unit 11 causes the process to proceed to Operation S46. The control unit 11 reduces the allocation cache memory size CS1 and calculates an allocation cache memory size CS2 after the reduction (Operation S46). For example, the allocation cache memory size CS1 is multiplied by a coefficient K less than 1, e.g. 0.2, to calculate the allocation cache memory size CS2. The value of the coefficient K may be appropriately changed by the input unit 16. The processing at Operation S46 may be executed only when the cash miss ratio is less than or equal to 0.005%.

When it is determined that the cash miss ratio is greater than or equal to the threshold value ("YES" at Operation S45), the control unit 11 causes the process to proceed to Operation S47. The control unit 11 multiplies the ratio LL of the memory access instruction by the cache memory miss ratio CM of the memory access instruction so as to calculate the cache miss ratio XX in the memory access instruction of all execution instructions (Operation S47). The control unit 11 corrects the ratio XX based on the ratio CC of wait time for access and calculates the ratio XX2 (Operation S48). For example, the control unit 11 corrects the ratio XX using the ratio CC of wait time for access which becomes a value between 0 and 1.0 when the entire execution time is set to 1. The dependency on the shared cache is increased as the ratio CC of wait time for access becomes larger. For that reason, the control unit 11 corrects the ratio XX in such a way that when the ratio CC of wait time for access is large, the ratio XX is adjusted to become slightly larger and when the ratio CC of wait time for time is small, the ratio XX is adjusted to become slightly smaller. For that reason, the ratio XX is multiplied by (0.9+CC) to calculate the ratio XX2 after the correction such that the ratio CC of wait time for time becomes 1 in a case of 0.1 (10%).

The control unit 11 performs correction such that the allocation cache memory size CS2 falls within a range less than or equal to twice the CS1 to the maximum (Operation S49). For example, the allocation cache memory size CS1 is multiplied by a value obtained by adding 1 to the ratio XX2 so as to calculate the allocation cache memory size CS2. When the allocation cache memory size CS2 exceeds twice the CS1, the allocation cache memory size CS2 is set to a value twice the allocation cache memory size CS1. After the processing at Operation S49 and the processing at Operation S46, the control unit 11 stores the calculated cache memory size CS2 in the information data file 152 (Operation S51). With this, it becomes possible to improve the execution speed.

Embodiment 2

Figure 7:
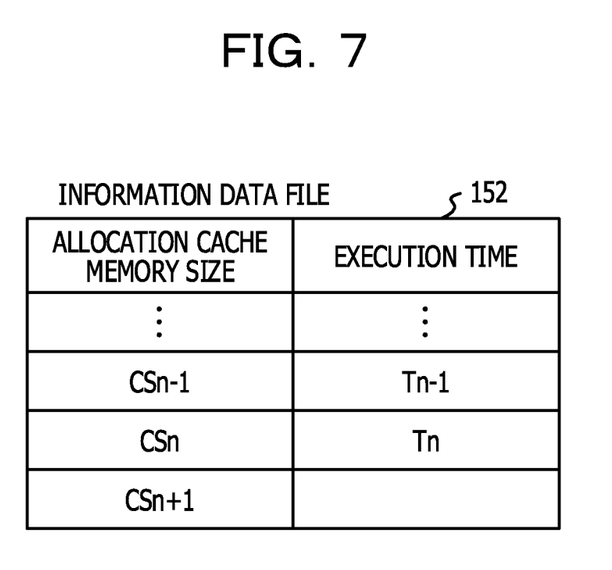
FIG. 7 is a table for explaining a record layout of an information data file.

Embodiment 2 is related to a configuration for a correction of the allocation cache memory size CS according to a performance value. FIG. 7 is a table for explaining a record layout of an information data file 152. The information data file 152 includes an allocation cache memory size field and an execution time field. An allocation cache memory size allocated by the control unit 11 is stored in the allocation cache memory size field. An execution time in a case where the process is executed using the allocated allocation cache memory size is stored as the performance value in the execution time field.

In the example of FIG. 7, the execution times Tn are stored in correlation with each other in a case where the process is executed using the allocation cache memory size CSn. n is a natural number. Performance is improved as the execution time becomes shorter. Although the execution time is used as the performance value in Embodiment 2, the execution time is just an example and the performance value is not limited thereto. For example, a processing quantity per unit time may be used as the performance value.

Figure 8:
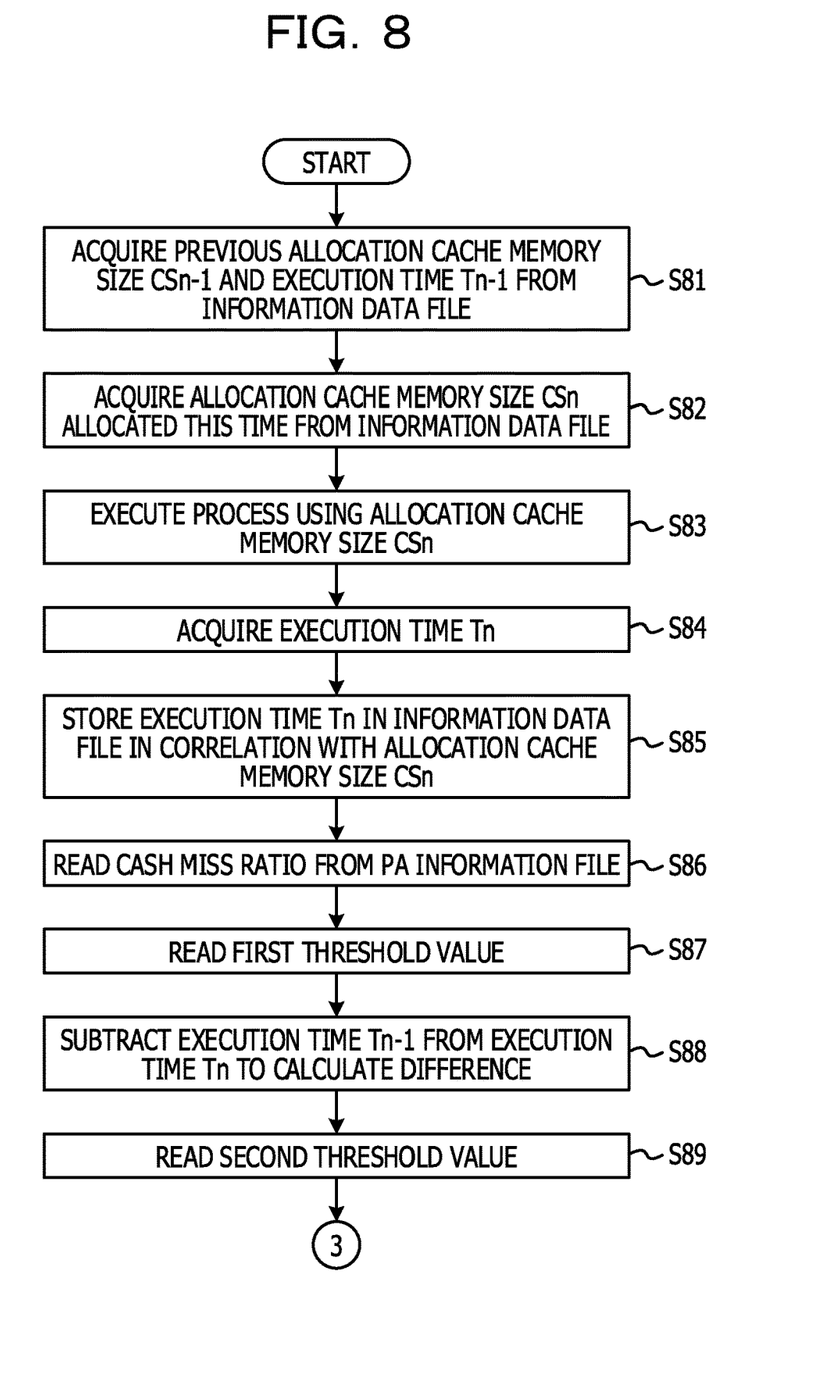
FIG. 8 is a flowchart illustrating a procedure of a correction process for an allocation cache memory size based on a performance value.
Figure 9:
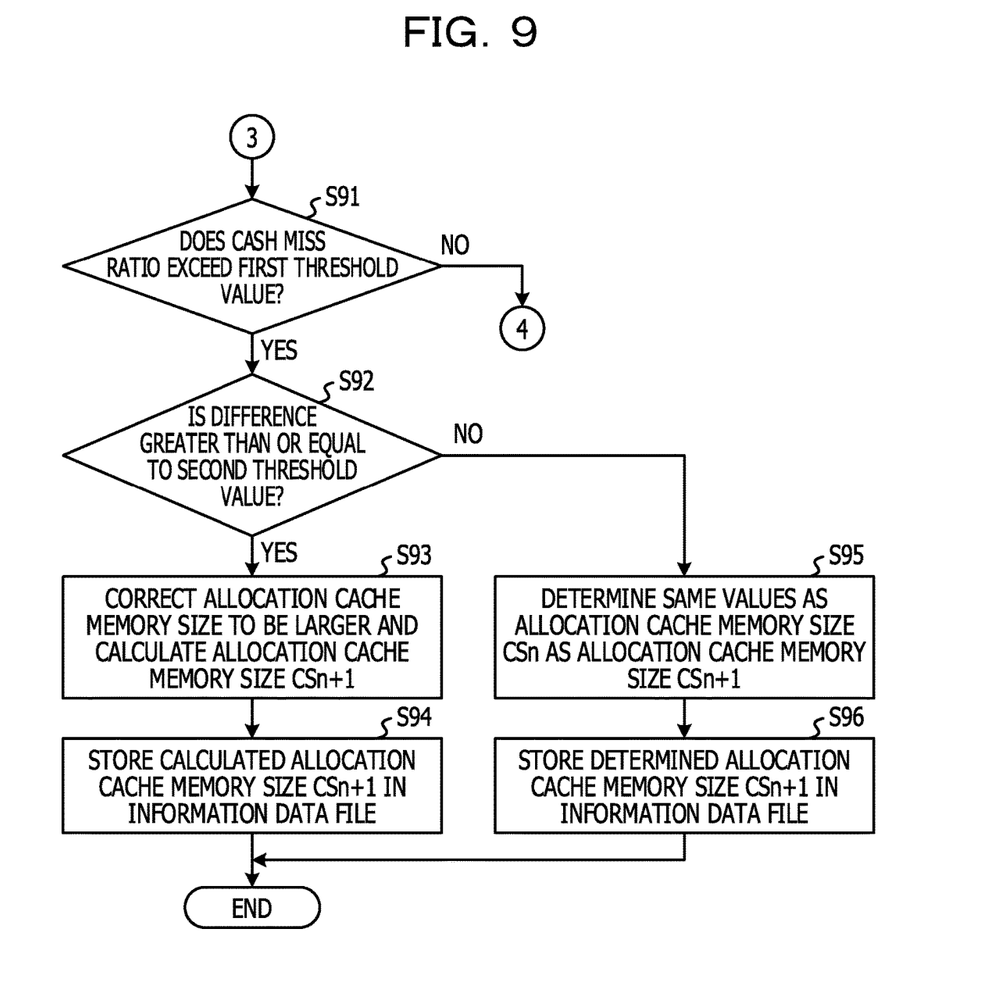
FIG. 9 is another flowchart illustrating the procedure of the correction process for the allocation cache memory size based on the performance value.
Figure 10:
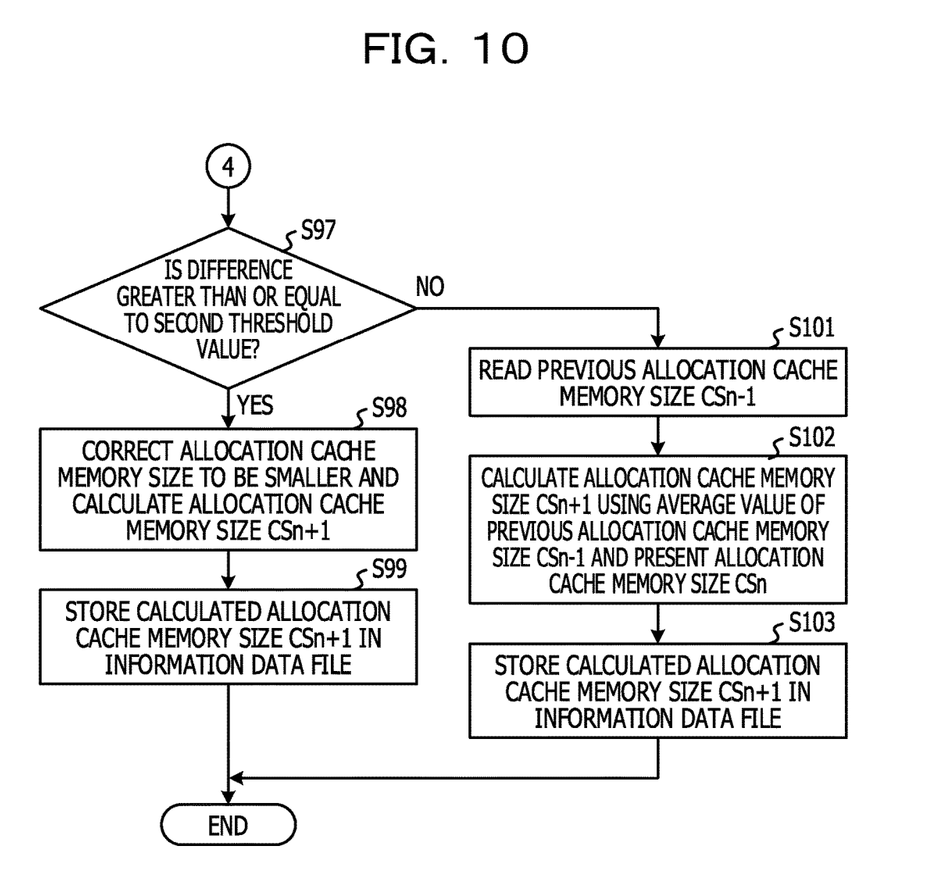
FIG. 10 is still another flowchart illustrating the procedure of the correction process for the allocation cache memory size based on the performance value.

FIG. 8 to FIG. 10 are flowcharts illustrating a procedure of a correction process for an allocation cache memory size based on a performance value. In addition to the process described in Embodiment 1, the following process is performed. The control unit 11 refers to the information data file 152 and acquires the previous allocation cache memory size CSn−1 and the previous execution time Tn−1 (Operation S81). The control unit 11 acquires the allocation cache memory size CSn allocated this time from the information data file 152 (Operation S82). Appropriate values, that are allocated, in advance, by at least one of various methods including a well known method, for the previous allocation cache memory size CSn−1 and the present allocation cache memory size CSn may be stored in the information data file 152. The control unit 11 executes the process of the application program using the allocation cache memory size CSn (Operation S83).

The control unit 11 acquires the execution time Tn that takes for the process from the start of execution to the end of execution (Operation S84). The control unit 11 stores the acquired execution time Tn in the information data file 152 in correlation with the allocation cache memory size CSn (Operation S85). The control unit 11 reads the cash miss ratio from the PA information file 151 (Operation S86). The control unit 11 reads the first threshold value from the storage unit 15 (Operation S87).

The control unit 11 subtracts the execution time Tn−1 which has been taken when the process is executed using the allocation cache memory size CSn−1 that has been allocated last time from the execution time Tn in order to calculate a difference (Operation S88). The control unit 11 reads the second threshold value from the storage unit 15 (Operation S89). The control unit 11 determines whether the cash miss ratio that has been read at Operation S86 exceeds a first threshold value (Operation S91). When it is determined that the cash miss ratio exceeds the first threshold value ("YES" at Operation S91), the control unit 11 causes the process to proceed to Operation S92.

The control unit 11 determines whether the difference exceeds a second threshold value (Operation S92). When it is determined that the difference exceeds the second threshold value ("YES" at Operation S92), the control unit 11 corrects the allocation cache memory size to be larger and calculates the allocation cache memory size CSn+1 (Operation S93). For example, the allocation cache memory size CSn+1 is calculated by multiplying the allocation cache memory size CSn by a coefficient larger than 1, e.g. 1.2. The control unit 11 stores the calculated allocation cache memory size CSn+1 in the information data file 152 (Operation S94).

When it is determined that the difference does not exceed the second threshold value ("NO" at Operation S92), the control unit 11 causes the process to proceed to Operation S95. The control unit 11 determines the same value as the allocation cache memory size CSn as the allocation cache memory size CSn+1 (Operation S95). The control unit 11 stores the determined allocation cache memory size CSn+1 in the information data file 152 (Operation S96).

When it is determined that the cash miss ratio does not exceed the first threshold value ("NO" at Operation S91), the control unit 11 causes the process to proceed to Operation S97. The control unit 11 determines whether the difference exceeds the second threshold value (Operation S97). When it is determined that the difference exceeds the second threshold value ("YES" at Operation S97), the control unit 11 causes the process to proceed to Operation S98. The control unit 11 corrects the allocation cache memory size to be smaller and calculates the allocation cache memory size CSn+1 (Operation S98). The control unit 11 multiplies, for example, the coefficient of 0.8 to correct the allocation cache memory size. The control unit 11 stores the calculated allocation cache memory size CSn+1 in the information data file 152 (Operation S99).

When it is determined that the difference does not exceed the second threshold value ("NO" at Operation S97), the control unit 11 causes the process to proceed to Operation S101. The control unit 11 reads the previous allocation cache memory size CSn−1 from the information data file 152 (Operation S101). The control unit 11 calculates the allocation cache memory size CSn+1 using an average value of the previous allocation cache memory size CSn−1 and the present allocation cache memory size CSn (Operation S102). The control unit 11 stores the calculated allocation cache memory size CSn+1 in the information data file 152 (Operation S103). As described above, the PA information is used only in the first time and after the PA information is used, only the performance value is used such that a processing load may be reduced. The correction is made based on the performance value and thus, the execution speed may be further improved.

Embodiment 2 is the same as described above and other matters are substantially the same as those of Embodiment 1 and thus, similar components are denoted by similar reference numerals and descriptions thereof will be omitted.

Embodiment 3

Figure 11:
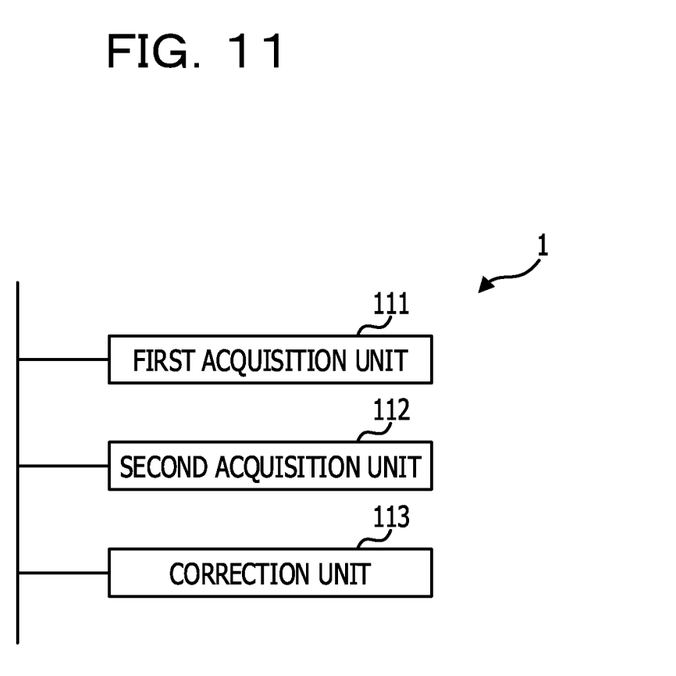
FIG. 11 is a functional block diagram illustrating operations of the information processing apparatus having the above described configuration.

FIG. 11 is a functional block diagram illustrating the operations of the information processing apparatus 1 having the above described configuration. The control unit 11 executes a control program 15P and, as a result, the information processing apparatus 1 operates as follows. A first acquisition unit 111 acquires a cache memory size allocated to each process within an application program. A second acquisition unit 112 acquires a cash miss ratio with respect to a process executed using the allocated cache memory size. A correction unit 113 corrects the cache memory size to be allocated to the process based on the acquired cash miss ratio.

Figure 12:
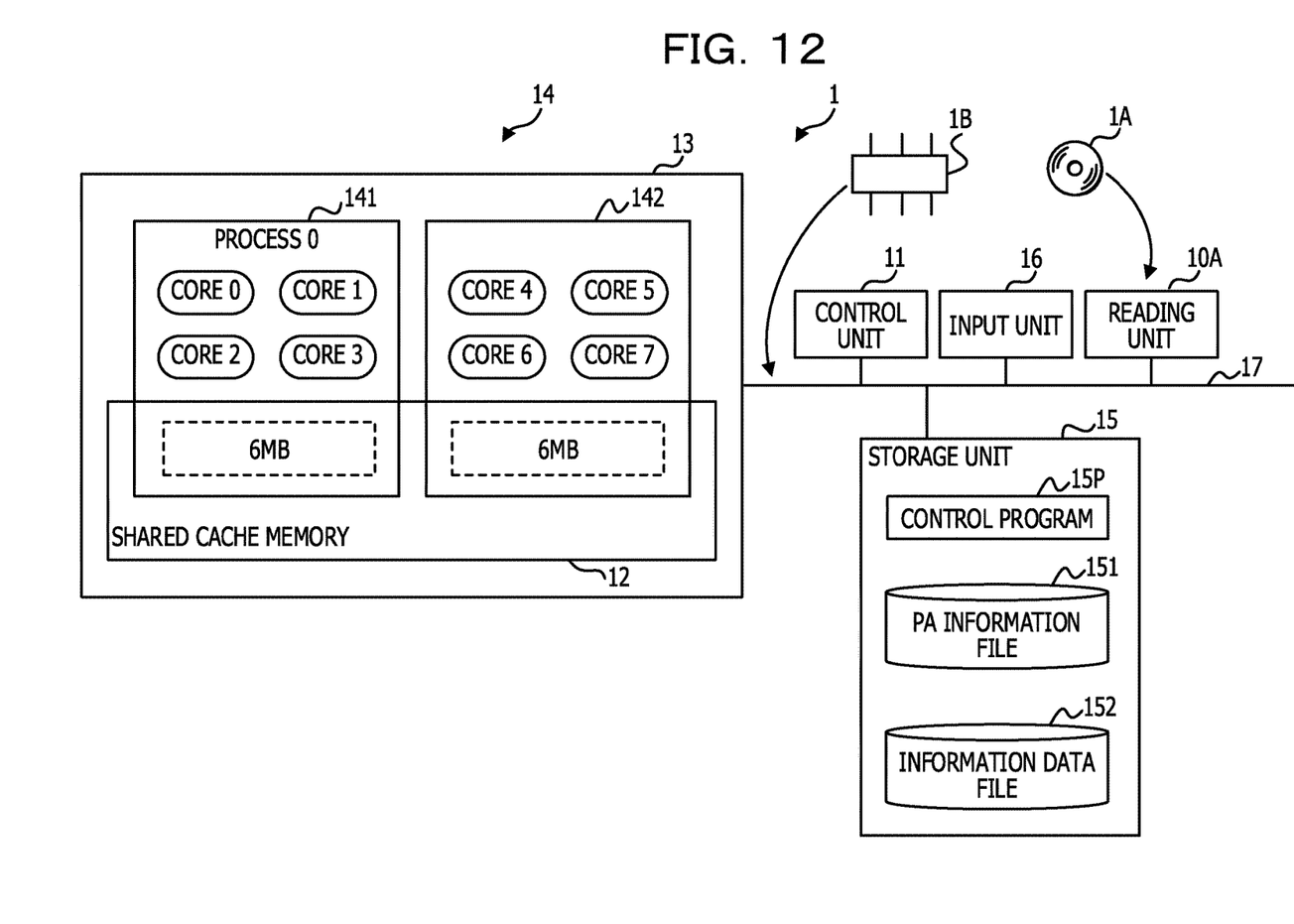
FIG. 12 is a block diagram illustrating a hardware group of an information processing apparatus according to Embodiment 3.

FIG. 12 is a block diagram illustrating a hardware group of the information processing apparatus 1 according to Embodiment 3. A program for causing the information processing apparatus 1 to operate may cause a reading unit 10A such as a disk drive to read a portable recording medium 1A such as a CD-ROM, a digital versatile disc (DVD), a memory card, or a universal serial bus (USB) memory and store the read contents in a storage unit 15. A semiconductor memory 1B such as a flash memory storing the program may be installed in the information processing apparatus 1. Furthermore, the program may be downloaded from other server computer (not illustrated) coupled through a communication network such as the Internet. In the following, the contents thereof will be described.

The information processing apparatus 1 illustrated in FIG. 12 reads the program, by which the above described various software processings are executed, from the portable recording medium 1A or the semiconductor memory 1B or downloads the program from other server computer (not illustrated) through the communication network. The program is installed as the control program 15P, is loaded onto the storage unit 15, and is executed. With this, the program functions as the above described information processing apparatus 1.

While Embodiment 3 is described above, other matters are substantially the same as those of Embodiment 1 and Embodiment 2 and thus, similar components are denoted by similar reference numerals, and descriptions thereof will be omitted.

Regarding embodiments including Embodiments 1 to 3, the following claims are further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute a process, the process comprising:

storing in a storage device a cache memory size to be allocated to each process of an application program to be executed by a plurality of CPU cores using a cache memory shared by the plurality of CPU cores;

retrieving from the storage device the cache memory size allocated to each process within the application program to be executed by the plurality of CPU cores using the cache memory shared by the plurality of CPU cores;

a first executing the application program by the plurality of CPU cores using the retrieved cache memory size allocated to each process of the application program, and calculating a cache miss ratio and a first performance value including a first execution time that has been taken to execute a process of the application program using the retrieved cache memory size allocated to each process of the application program;

a first correcting the cache memory size to a first cache memory size to be allocated to the process of the application program based on the calculated cache miss ratio;

a second executing the process of the application program by the plurality of CPU cores using the first cache memory size corrected at the first correcting and calculating a second performance value including a second execution time that has been taken to execute the process of the application program using the first cache memory size corrected at the first correcting; and a second correcting the first cache memory size to a second cache memory size based only on the first performance value including the calculated first execution time and the second performance value including the calculated second execution time, the second correcting increases the first cache memory size when the cache miss ratio exceeds a first threshold value and a difference between the first execution time and the second execution time exceeds a second threshold value, and the second correcting decreases the first cache memory size when the cache miss ratio does not exceed the first threshold value and the difference between the first execution time and the second execution time exceeds the second threshold value.

2. The non-transitory computer-readable recording medium according to claim 1, further comprising: acquiring a ratio of memory access instructions; wherein the first correcting corrects the cache memory size to the first cache memory size to be allocated to the process based on the acquired ratio of memory access instruction and the calculated cache miss ratio.

3. The non-transitory computer-readable recording medium according to claim 1, further comprising: acquiring a ratio of memory access instructions and an access wait time for the cache memory; and calculating an integrated value by multiplying the cache miss ratio by an acquired ratio of memory access instructions, wherein the first correcting corrects the cache memory size to the first cache memory size to be allocated to the process based on the integrated value and the access wait time.

4. The non-transitory computer-readable recording medium according to claim 1, wherein the second correcting corrects the first cache memory size to the second cache memory size to become larger in a case where it is determined that the calculated cache miss ratio exceeds the first threshold value and the second performance value is reduced to be lower than the first performance value.

5. The non-transitory computer-readable recording medium according to claim 1, wherein the second correcting corrects the first cache memory size to the second cache memory size to become smaller in a case where it is determined that the calculated cache miss ratio does not exceed the first threshold value and the second performance value is not reduced to be lower than the first performance value.

6. An information processing apparatus comprising:
a processor configured to execute a control program; and
a memory configured to store the control program,
the processor, based on the control program, preforms operations of:
  storing in a storage device a cache memory size to be allocated to each process of an application program to be executed by a plurality of CPU cores using a cache memory shared by the plurality of CPU cores;
  retrieving from the storage device the cache memory size allocated to each process of the application program to be executed by the plurality of CPU cores using the cache memory shared by the plurality of CPU cores;
  a first executing the application program by the plurality of CPU cores using the retrieved cache memory size allocated to each process of the application program, and calculating a cache miss ratio and a first performance value including a first execution time that has been taken to execute a process of the application program using the retrieved cache memory size allocated to each process of the application program;
  a first correcting the cache memory size to a first cache memory size to be allocated to the process of the application program based on the calculated cache miss ratio;
  a second executing the process of the application program by the plurality of CUP cores using the first cache memory size corrected at the first correcting and calculating a second performance value including a second execution time that has been taken to execute the process of the application program using the first cache memory size corrected at the first correcting; and
  a second correcting the first cache memory size to a second cache memory size based only on the first performance value including the calculated first execution time and the second performance value including the calculated second execution time,
  the second correcting increases the first cache memory size when the cache miss ratio exceeds a first threshold value and a difference between the first execution time and the second execution time exceeds a second threshold value, and
  the second correcting decreases the first cache memory size when the cache miss ratio does not exceed the first threshold value and the difference between the first execution time and the second execution time exceeds the second threshold value.

7. The information processing apparatus according to claim 6, wherein the second correcting corrects the first cache memory size to the second cache memory size to become larger in a case where it is determined that the calculated cache miss ratio exceeds the first threshold value and the second performance value is reduced to be lower than the first performance value.

8. The information processing apparatus according to claim 6, wherein the second correcting corrects the first cache memory size to the second cache memory size to become smaller in a case where it is determined that the calculated cache miss ratio does not exceed the first threshold value and the second performance value is not reduced to be lower than the first performance value.

9. An information processing method comprising:
storing in a storage device a cache memory size to be allocated to each process of an application program to be executed by a plurality of CPU cores using a cache memory shared by the plurality of CPU cores;
retrieving, by an information processing apparatus, the cache memory size allocated to each process within the application program to be executed by the plurality of CPU cores using the cache memory shared by the plurality of CPU cores from the storage device;
a first executing the application program by the plurality of CPU cores using the retrieved cache memory size allocated to each process of the application program, and calculating a cache miss ratio and a first performance value including a first execution time that has been taken to execute a process of the application program using the retrieved cache memory size allocated to each process of the application program;
a first correcting the cache memory size to a first cache memory size to be allocated to the process of the application program based on the calculated cache miss ratio;
a second executing the process of the application program by the plurality of CPU cores using the first cache memory size and calculating a second performance value including a second execution time that has been taken to execute the process of the application program using the first cache memory size corrected at the first correcting; and
a second correcting the first cache memory size to a second cache memory size based on the first performance value including the calculated first execution time and the second performance value including the calculated second execution time,
the second correcting increases the first cache memory size when the cache miss ratio exceeds a first threshold value and a difference between the first execution time and the second execution time exceeds a second threshold value, and
the second correcting decreases the first cache memory size when the cache miss ratio does not exceed the first threshold value and the difference between the first execution time and the second execution time exceeds the second threshold value.

10. The information processing method according to claim 9, further comprising: determining whether the calculated cache miss ratio exceeds the first threshold value, wherein the first correcting corrects the cache memory size to the first cache memory size to be allocated to the process to become larger when the calculated cache miss ratio exceeds the first threshold value.

11. The information processing method according to claim 9, wherein the second correcting corrects the first cache memory size to the second cache memory size to become larger in a case where it is determined that the calculated cache miss ratio exceeds the first threshold value and the second performance value is reduced to be lower than the first performance value.

12. The information processing method according to claim 9, wherein the second correcting corrects the first cache memory size to the second cache memory size to become smaller in a case where it is determined that the calculated cache miss ratio does not exceed the first threshold value and the second performance value is not reduced to be lower than the first performance value.

\* \* \* \* \*